Patented June 25, 1946

2,402,807

UNITED STATES PATENT OFFICE 2,402,807

ISOMERIZATION OF HYDROCARBONS

Gustav Egloff, Chicago, Ill., assignor to Universal Oil Products Company, Chicago, Ill., a corporation of Delaware No Drawing. Application May 25, 1942, Serial No. 444,430

11 Claims. (Cl. 260—683.5)

This invention relates to a process for the production of highly branched paraffin hydrocarbons from normal or mildly branched paraffin hydrocarbons by catalyzed isomerization reactions, and the process is more specifically directed to the manufacture of 2,2,3-trimethylbutane, which hydrocarbon is generally known as triptane.

In the paraffin hydrocarbon series, it has been established as a general rule that the more highly branched compounds have higher knock ratings than their less highly branched isomeric counterparts. Thus, the iso-octane having the structure 2,2,4-trimethylpentane has been accepted for some time as a standard for rating hydrocarbons or hydrocarbon mixtures in respect to their antiknock value when used as fuel in standard test engines. In contrast to the antiknock value of this compound which is usually rated as 100, the antiknock value of normal heptane is placed as 0, so that these two hydrocarbons represent the limits of an arbitrary scale of values employed in evaluating the antiknock properties of hydrocarbons.

It is known in the art that substantial yields of branched isomers can be produced from normal paraffin hydrocarbons by contacting the latter with catalysts of the Friedel-Crafts type, particularly such compounds as aluminum chloride, aluminum bromide, zirconium chloride, zinc chloride, ferric chloride and others in the presence of hydrogen halides such as hydrogen chloride or hydrogen bromide. In effecting such isomerizations it has been found that an equilibrium between the possible isomers is usually reached under the conditions of operation depending principally upon the factors of temperature and time of contact with a selected catalyst, although other factors such as the presence of varying amounts of hydrogen halides and hydrogen may influence the equilibrium actually attained. In the present process use is made of the equilibria attained in the step-wise isomerization of normal paraffins to effect a degree of isomerization hitherto unattained in such processes.

In one specific embodiment the present invention comprises a process for the manufacture of triptane from normal heptane which consists in subjecting said normal heptane to contact with a metal halide-hydrogen halide catalyst in the primary stage to effect a limited isomerization with the production of methyl hexanes and ethyl pentanes, fractionating the products to produce a cut boiling from about 90 to about 92° C. comprising said hexanes and said pentanes, and heavier fractions which are recycled to further treatment in admixture with the normal heptane, further subjecting the 90–92° C. fraction in a second step to contact with metal halide-hydrogen halide catalysts at a lower temperature to produce substantial yields of dimethylpentanes, fractionating the products from the second step to produce a fraction boiling from about 75 to about 90° C. and comprising said dimethylpentanes, and a higher boiling fraction which is recycled to further isomerization, subjecting the 75–90° C. fraction in a third step to contact with metal halide-hydrogen halide catalyst to effect further isomerization of said pentanes and fractionating the products from a third step to recover a fraction boiling between about 79 and about 81° C. comprising 2,2-dimethylpentane, 2,4-dimethylpentane and 2,2,3-trimethylbutane, while recycling higher boiling materials to further isomerization treatment.

In accordance with the principles of the present invention the isomerization of normal heptane is accomplished progressively in a series of steps in which conditions of isomerization are modified to favor equilibria corresponding to the production of the most highly branched isomer triptane. Thus, the temperatures employed in the successive steps are progressively decreased. In the first step in which normal heptane undergoes primary isomerization into methyl hexanes and ethyl pentanes, temperatures of from about 0 to about 75° C. may be employed depending upon the activity of the metal halide-hydrogen halide catalysts used for effecting isomerization. In this step pure aluminum chloride or aluminum bromide may be used along with substantial amounts of hydrogen chloride or hydrogen bromide and in order to produce maximum amounts of the methyl hexanes and ethyl pentanes, the time of contact with the composite isomerizing catalyst is kept relatively short, and emphasis is placed on a relatively high recycle rate of unconverted normal heptane to insure high yields of the desired primary isomerization products. Following the primary isomerizing step, the products are fractionated to recover an isomer fraction boiling from about 90 to about 92° C. which consists largely of methyl hexanes, using fractionators of capacity adequate for effecting a relatively sharp separation of this cut. The boiling point of 2-methyl hexane at 760 mm. pressure is 90.1° C. and that of 3-methyl hexane is 91.9° C. so that the 90–92° C. cut will consist largely of these two compounds and the recycled material which is returned to further isomerizing treatment will consist principally of unconverted normal heptane and some ethyl pentanes.

In the second step of the process the methyl hexane fraction boiling from about 30 to about 92° C. is further isomerized to produce a mixture of dimethyl pentanes. In this step the temperature employed is lower than that employed for the primary step and will be somewhere within the range of −25 to 50° C., depending again on the activity of the catalyst and the amount of hydrogen halide used. In general, the conditions employed in the second step will be modified in the direction of decreased isomerizing activity, and in this step in order to avoid undesirable side reactions involving decomposition rather than isomerization of the hydrocarbons, hydrogen may be introduced to the isomerizing zone in molecular form or it may be generated in situ by interaction of added hydrogen chloride with metals in admixture with the metal halide. Similarly, instead of using aluminum chloride in the second step, its action may be modified by the presence of other metal halides such as, zinc chloride, zirconium chloride or ferric chloride. Again, contact times are preferably short to favor the production of the dimethylpentanes as the principal products of the secondary step. After the isomerization has been effected to the desired degree, the dimethylpentanes are recovered by separating a fraction boiling within the approximate range of 75 to 90° C. by the use of fractionating apparatus of suitable design and capacity. Boiling points of the dimethylpentanes are given below:

| Dimethylpentane | Boiling point |
| --- | --- |
| | ° C. |
| 2,2-dimethylpentane | 79.2 |
| 2,4-dimethylpentane | 80.7 |
| 3,3-dimethylpentane | 86.0 |
| 2,3-dimethylpentane | 89.8 |

The hydrocarbon fraction boiling above 90° C. is recycled either to the recycle primary step or to the secondary step for further isomerizing treatment.

In the third step of the process the recovered dimethylpentane fraction boiling from about 75 to about 90° C. is further contacted with metal halide-hydrogen halide catalysts at still lower temperatures, preferably below −35° C. and the catalyst composite consisting of the metal halide and hydrogen halide is proportioned to favor the production of the more highly branched isomers without fostering decomposition reactions. In this third and final stage of the process, under suitably chosen conditions of operation in respect to temperature, catalytic activity, contact time, etc., substantial yields of the desired triptane are produced and by fractionating to produce a 79–81° C. fraction from the hydrocarbon products, a mixture consisting of 2,2, and 2,4-dimethylpentanes and 2,2,3-trimethylbutane is recovered. The normal boiling points of the dimethlypentanes have been given above. The normal boiling point of the desired triptane is 80.9° C., and it is, therefore difficultly separable from the 2,4-dimethylpentane. However, as will be shown in later examples, it is producible in substantial concentrations in admixture with the dimethyl pentanes to form hydrocarbon mixtures of exceptionally high antiknock value.

In the foregoing paragraphs a description has been given of the essential steps of the present process without regard to non-essential details of the operation. In this respect each of the successive steps may be carried out in any desired manner to accomplish the stepwise production of isomers with an increased degree of hydrocarbon chain branching. Thus, the steps may be conducted in batch operation by merely charging the material to be isomerized into reaction vessels capable of withstanding pressure along with the catalyst and added hydrogen and the reactants subjected to heating for a limited period of time after which the reaction products are fractionated, although such operations are not favored since they do not permit the use of the preferred short times of reaction corresponding to limited conversions.

Continuous operations may be conducted by passing the hydrocarbon mixtures charged to each step along with hydrogen chloride and, if desired, hydrogen through stationary beds of granular metal halides followed by continuous fractionation with recovery of the desired cuts for further isomerization, such operations involving the use of alternate reaction and fractionation zones with passage of the primary isomer fractions to succeeding stages and recycle of hydrogen chloride and unconverted hydrocarbon fractions back to preceding stages. Granular catalysts used in this type of operation may consist of particles of the metal halides themselves or particles consisting of granules of relatively inert supporting materials to which the metal halide has been added by any suitable method. Examples of such catalyst supports are such substances as activated carbon, prepared aluminum oxides, bauxite, clays, kieselguhr and other more or less refractory materials having varying absorptive capacities.

Another type of continuous operation which may be employed in any one or all of the three steps of the process consists in passing the hydrocarbon or hydrocarbon mixture to be isomerized through a bed of granular metal halide in the absence of a hydrogen halide under conditions of temperature and pressure at which the hydrocarbon mixture dissolves the metal halide, and passing solution of metal halide and hydrocarbon along with added hydrogen halide into a reactor packed with granular materials which are generally inert and have varying absorptive capacities for the metal halide dissolved in the hydrocarbon. In such processes the dissolved metal halide is deposited upon the granules in the reactor and isomerization ensues in the presence of the added hydrogen halide. In this scheme of operations fresh surfaces of metal halide are continually exposed so that catalytic activity in the packed reactor is maintained over extended periods of time while metal halide-hydrocarbon complexes may flow downwardly to be removed at the bottom of the packed reactor, or are absorbed in the pores of the granular material.

Other types of isomerization procedures which may be used in the steps of the process include those in which a stream of the vapors of the hydrocarbons to be isomerized carries powdered metal halide catalyst upwardly through a reaction chamber to which hydrogen chloride or hydrogen halide is added to effect the desired isomerization, the powdered metal halide being separated in a succeeding chamber, subjected to any reactivation steps which are necessary to restore its activity and then returned to further contact with incoming hydrocarbon vapors.

The following example is introduced to illustrate the results which are normally obtainable in the use of the process although the scope of the invention is not intended to be limited in exact accordance therewith.

Normal heptane is subjected to isomerization by passing it at a temperature of 75° C. upwardly through a granular catalyst bed containing granular composite material consisting of 80 per cent by weight of activated alumina and 20 per cent by weight of aluminum chloride. Five mole per cent of hydrogen chloride in respect to the normal heptane is admitted along with the hydrocarbon. The hydrocarbon products from the isomerizing step are fractionated to remove products boiling below 90° C. and recover the hydrocarbon fraction boiling from 90 to 92° C. comprising principally 2-methyl and 3-methyl hexane. The products boiling below 90° C. are further fractionated to recover hydrogen chloride which is recycled to mix with the normal heptane charge and a fraction boiling above 92° C. and comprising 85 per cent normal heptane is recycled to further contact with the granular catalyst. The 90–92° C. fraction continuously produced with recycling of unconverted material is equal to 70 per cent by volume of the normal heptane charge.

The 90–92° C. fraction is contacted with another stationary bed of the same type of catalyst employed in the first step at a temperature of 0° C. in the presence of 5 mole per cent of hydrogen chloride based on the mixture of methyl hexanes charged. The products from the second step are fractionated to produce hydrogen chloride which is recycled in the same step, a 60 volume per cent yield of a hydrocarbon fraction boiling from 75 to 90° C. and a heavier fraction boiling above 90° C. and containing ethyl pentanes. The last named fraction is continuously recycled to undergo further isomerization in admixture with the methyl hexane fraction.

The 75–90° C. fraction comprising dimethylpentanes is now contacted with a granular composite catalyst consisting of activated alumina supporting an equimolar mixture of aluminum chloride and aluminum bromide at a temperature of −40° C., the liquid hourly space velocity of the hydrocarbon mixture in respect to the volume of catalyst being 0.05.

The effluent materials from this catalytic contact are continuously fractionated to separate the added hydrogen halides for recycling, and to produce a 50 per cent yield of a 79–81° C. fraction and higher boiling products which are recycled to further isomerizing treatment in admixture with the dimethylpentanes. Analysis of the 79–81° C. fraction indicates the presence of 60 per cent of a mixture of 2,2 and 2,4-dimethylpentanes and 40 per cent of 2,2,3-trimethylbutane. The octane number of this fraction is found to be 95 in comparison with a standard 2,2,4-trimethylpentane.

By the above described operation there is thus continuously produced a 21 per cent overall yield of 95 octane number hydrocarbon material based on the normal heptane charge, the yield of triptane being 8 per cent by volume based on the heptane charged.

I claim as my invention:

1. A process for the isomerization of normal heptane to produce triptane therefrom which comprises subjecting said normal heptane in the presence of a hydrogen halide to contact with a metal halide catalyst in a primary stage under conditions adequate to produce substantial yields of methyl hexanes, separating said methyl hexanes and subjecting them in a secondary stage to contact with a metal halide catalyst in the presence of a hydrogen halide under conditions adequate to produce substantial yields of dimethylpentanes, separating said dimethylpentanes and subjecting them in the presence of a hydrogen halide in a tertiary stage to contact with a metal halide catalyst under conditions adequate to produce substantial yields of triptane.

2. A process for the isomerization of normal heptane to produce triptane therefrom which comprises subjecting said normal heptane in the presence of a hydrogen halide to contact at a temperature of from about 0 to about 75° C. with a metal halide catalyst in a primary stage to produce substantial yields of methyl hexanes, separating said methyl hexanes and subjecting them in the presence of a hydrogen halide in a secondary stage to contact at a temperature of from about −25 to about +50° C. with a metal halide catalyst to produce substantial yields of dimethylpentanes, separating said dimethylpentanes and subjecting them in the presence of a hydrogen halide in a tertiary stage to contact at a temperature below −35° C. with a metal halide catalyst to produce substantial yields of triptane.

3. A process for the isomerization of normal heptane to produce triptane therefrom which comprises subjecting said normal heptane in the presence of a hydrogen halide to contact at a temperature of from about 0 to about 75° C. with a metal halide catalyst in a primary stage, fractionating the products from said primary stage into hydrogen halide, hydrocarbons boiling below 90° C., a hydrocarbon fraction boiling from about 90 to about 92° C. and a higher-boiling hydrocarbon fraction, returning said hydrogen halide and said higher-boiling hydrocarbon fractions to further contact with said metal halide catalyst in the primary stage, removing hydrocarbons boiling below 90° C., subjecting said fraction boiling between about 90 and about 92° C. in the presence of a hydrogen halide to contact at a temperature of from about −25 to about +50° C. with a metal halide catalyst in a secondary stage, fractionating the products from said secondary stage to produce hydrogen halide, compounds boiling below 75° C., a fraction boiling from about 75 to about 90° C., and a higher-boiling hydrocarbon fraction, returning said hydrogen halide and said higher-boiling hydrocarbon fraction to further treatment in said secondary stage, subjecting said fraction boiling from about 75 to about 90° C. in the presence of a hydrogen halide to contact at a temperature below −35° C. with a metal halide catalyst in a tertiary stage, fractionating to produce hydrogen halide, compounds boiling below 79° C., a hydrocarbon fraction boiling from about 79 to about 81° C. and a higher-boiling hydrocarbon fraction, removing said compounds boiling below 79° C., returning said hydrogen halide and said higher-boiling hydrocarbon fraction to further treatment in said tertiary state and recovering said fraction boiling from about 79 to about 81° C.

4. A process for the isomerization of normal heptane to produce triptane therefrom which comprises subjecting said normal heptane in the presence of hydrogen chloride to contact with an aluminum chloride catalyst in a primary stage under conditions adequate to produce substantial yields of methyl hexanes, separating said methyl hexanes and subjecting them in the presence of hydrogen chloride in a secondary stage to contact with an aluminum chloride catalyst under conditions adequate to produce substantial yields of dimethylpentanes, separating said dimethylpentanes and subjecting them in the presence of hydrogen chloride in a tertiary stage to contact with an aluminum chloride catalyst under conditions adequate to produce substantial yields of triptane.

5. A process for the isomerization of normal heptane to produce triptane therefrom which comprises subjecting said normal heptane in the presence of hydrogen chloride to contact at a temperature of from about 0 to about 75° C. with an aluminum chloride catalyst in a primary stage to produce substantial yields of methyl hexanes, separating said methyl hexanes and subjecting them in the presence of hydrogen chloride in a secondary stage to contact at a temperature of from about −25 to about +50° C. with an aluminum chloride catalyst to produce substantial yields of dimethylpentanes, separating said dimethylpentanes and subjecting them in the presence of hydrogen chloride in a tertiary stage to contact at a temperature below −35° C. with an aluminum chloride catalyst to produce substantial yields of triptane.

6. A process for the isomerization of normal heptane to produce triptane therefrom which comprises subjecting said normal heptane in admixture with hydrogen chloride to contact at a temperature of from about 0 to about 75° C. with an aluminum chloride catalyst in a primary stage, fractionating the products from said primary stage to produce hydrogen chloride, hydrocarbons boiling below 90° C., a hydrocarbon fraction boiling from about 90 to about 92° C. and a higher-boiling hydrocarbon fraction, returning said hydrogen chloride and said higher-boiling hydrocarbon fraction to further contact with said aluminum chloride catalyst in said primary stage, removing hydrocarbons boiling below 90° C., subjecting said fraction boiling between about 90 and about 92° C. in admixture with hydrogen chloride to contact at a temperature of from about −25 to about +50° C. with an aluminum chloride catalyst in a secondary stage, fractionating the products from said secondary stage to produce hydrogen chloride, compounds boiling below 75° C., a fraction boiling from about 75 to about 90° C., and a higher-boiling hydrocarbon fraction, returning said hydrogen chloride and said higher-boiling hydrocarbon fraction to further treatment in said secondary stage, subjecting said fraction boiling from about 75 to about 90° C. in admixture with hydrogen chloride to contact at a temperature below −35° C. with an aluminum chloride catalyst in a tertiary stage, fractionating to produce hydrogen chloride, compounds boiling below 79° C., a hydrocarbon fraction boiling from about 79 to about 81° C. and a higher-boiling hydrocarbon fraction, returning said hydrogen chloride and said higher boiling hydrocarbon fraction to further treatment in said tertiary stage and recovering said fraction boiling from about 79 to about 81° C.

7. A process for the treatment of normal heptane to produce isomeric heptanes therefrom which comprises subjecting said normal heptane in the presence of a hydrogen halide to contact with a metal halide catalyst in a primary stage under conditions adequate to produce substantial yields of methyl hexanes, separating said methyl hexanes and subjecting them in a secondary stage to contact with a metal halide catalyst in the presence of a hydrogen halide under conditions adequate to produce substantial yields of dimethylpentanes, separating said dimethylpentanes and subjecting them in the presence of a hydrogen halide in a tertiary stage to contact with a metal halide catalyst under conditions adequate to produce substantial yields of other isomeric heptanes.

8. A process for the treatment of normal heptane to produce branched chain hydrocarbons therefrom which comprises subjecting said normal heptane in the presence of hydrogen chloride to contact at a temperature of from about 0 to about 75° C. with an aluminum chloride catalyst in a primary stage to produce substantial yields of methyl hexanes, separating said methyl hexanes and subjecting them in the presence of hydrogen chloride in a secondary stage to contact at a temperature of from about −25 to about +50° C. with an aluminum chloride catalyst to produce substantial yields of dimethyl pentanes, separating said dimethylpentanes and subjecting them in the presence of hydrogen chloride in a tertiary stage to contact at a temperature below −35° C. with an aluminum chloride catalyst.

9. A process for producing triptane which comprises isomerizing normal heptane under conditions regulated to produce methyl hexanes and ethyl pentanes therefrom, separating from the resultant products a fraction boiling from about 90° C. to about 92° C., subjecting said fraction to controlled isomerization to produce dimethylpentanes therefrom, separating from the products of the last-mentioned step a fraction boiling from about 75° C. to about 90° C., and subjecting the last-named fraction to isomerizing conditions regulated to convert a portion thereof into 2,2,3-trimethylbutane.

10. A process for producing triptane which comprises subjecting a mixture of dimethylpentanes to the action of an isomerizing catalyst at an isomerizing temperature below −35° C.

11. A process for producing triptane which comprises subjecting a mixture of dimethylpentanes to the action of an aluminum halide and a hydrogen halide at an isomerizing temperature below −35° C.

GUSTAV EGLOFF.